US006449854B1

United States Patent
Cheung (10) Patent No.: US 6,449,854 B1
(45) Date of Patent: Sep. 17, 2002

(54) UNIVERSAL SOLAR CHART SHADOW PLOTTER AND METHOD FOR PLOTTING A SHADOW

(75) Inventor: Kwok Pun Cheung, Hong Kong SAR (HK)

(73) Assignee: University of Hong Kong, Hong Kong (CN)

( * ) Notice: Subject to any disclaimer, the term of this patent is extended or adjusted under 35 U.S.C. 154(b) by 0 days.

(21) Appl. No.: 09/705,983

(22) Filed: Nov. 3, 2000

(51) Int. Cl.[7] ............................................... G01C 17/34
(52) U.S. Cl. ............................ 33/268; 33/562; 33/15 C
(58) Field of Search .......................... 33/268, 269, 270, 33/1 H, 15 C, 1 DD, 1 G, 562, 563, 566, 413

(56) References Cited

U.S. PATENT DOCUMENTS

| | | | | | |
|---|---|---|---|---|---|
| 780,178 A | * | 1/1905 | Henning | ...................... | 283/115 |
| 910,230 A | * | 1/1909 | Pratt | ........................ | 235/88 R |
| 990,764 A | * | 4/1911 | Morse | ........................ | 434/84 |
| 1,391,305 A | * | 9/1921 | Eldridge | ..................... | 33/1 SC |
| 1,817,350 A | * | 8/1931 | Clay | ........................... | 33/1 DD |
| 2,478,315 A | * | 8/1949 | Pollman | ..................... | 33/1 DD |
| 2,531,932 A | * | 11/1950 | Brown | ......................... | 33/268 |
| 2,715,273 A | * | 8/1955 | Dodd et al. | ................. | 33/1 SC |
| 2,884,697 A | * | 5/1959 | Sylvester | ................... | 33/1 DD |
| 5,186,630 A | * | 2/1993 | Tien | ............................. | 434/149 |
| 5,425,178 A | * | 6/1995 | Steele | ......................... | 33/268 |

FOREIGN PATENT DOCUMENTS

| GB | 2158618 A | * | 11/1985 | .................. | 33/270 |
|---|---|---|---|---|---|
| WO | WO-9305362 A | * | 3/1993 | .................. | 33/270 |

OTHER PUBLICATIONS

"Boa E. Isolation Design for Buildings", Technology Publisher's Limited. Taipei, Taiwan (1979). (pp. 50,51).

* cited by examiner

Primary Examiner—Diego Gutierrez
Assistant Examiner—Mirellys Jagan
(74) Attorney, Agent, or Firm—William D. McSpadden; Baker & McKenzie (57) ABSTRACT

An apparatus for estimating a shadow on a scaled figure is presented herein. The apparatus includes a circular disk with a lines corresponding to the declination angle of the earth with respect to the sun at particular dates of the year. The apparatus also includes arcs on the circular disk which correspond to the earth's rotation at particular times of the day. The circular disk can also have a slot to facilitate insertion of a pencil or pen time therein. The circular disk is substantially transparent to enable a user to lay the disk over a scaled figure and make calculations and measurements corresponding to a shadow to be estimated. Also disclosed is a method for estimating a shadow for a structure depicted in a scaled figure. The circular disk is placed over the scaled figure such that the slot in the disk is aligned with an azimuth of the sun so as to trace a shadow line. The circular disk is then reoriented perpendicular to the shadow line so that a scaled height line may be traced. The circular disk is then relocated so that the center of the slot is located at the end of the scaled height line. The circular disk is then rotated to an angle corresponding to the height of the sun and a projection line is traced in the slot from the end of the scaled height line to the shadow line. In this manner, the length of the shadow for a given azimuth and altitude can be determined.

11 Claims, 12 Drawing Sheets

UNIVERSAL SOLAR CHART SHADOW PLOTTER AND METHOD FOR PLOTTING A SHADOW

TECHNICAL FIELD

The present application relates to architectural tools, and more particularly tools for estimating the position and dimensions of shadows.

BACKGROUND

The addition of shadows to a complex model can greatly enhance the understanding of that model's geometry. The human visual system uses shadows as a cue for depth and shape. Consequently, shadows are very useful for conveying the three dimensional nature of objects and for adding realism to complex models. Additionally, many jurisdictions take into consideration the shadows that will be cast by proposed structures in order to grant building permits. Thus, it is often imperative that an applicant for a building permit be able to provide thorough and accurate estimates of the shadows that will be cast.

Current methods for estimating the shadow cast by a structure use a series of graphs for estimating the solar shadow. These methods include the use of horizontal and vertical shadow mast diagrams, which are commonly produced for variables including Apparent Solar Time (AST), the declination angle of the sun with respect to the center of the earth (d), solar azimuth angle, A (A=0 degrees for north, 90 degrees for east, etc.), northern geographical latitude (L), and solar altitude angle (h). These methods include horizontal shadow mast diagrams in which the latitude, L, is fixed for the shadow mast cast on a horizontal plane at various d, A, h, and AST. Alternatively, the method may include horizontal shadow mast diagrams for fixed L and d, for varying A, h, and AST. The methods also include vertical shadow mast diagrams in which L and A are fixed for the shadow of the mast to be cast on a vertical plane for varying h, d, and AST.

These methods tend to be extremely tedious and time consuming for implementation. Problems encountered by many architects include excessive number of projection lines on the graphs which are likely to cause confusion. Furthermore, an inherent defect with these methods is that the shadow for the mast during sunrise and sunset (when the h is low) cannot be shown on the diagrams.

Another commonly used method is to read off altitude angle, h for the concerned AST and A (or AST and d) from solar charts. The altitude angle, h is then manipulated graphically, and the shadow cast by direct sunlight is estimated by trigonometric calculations. This process involves conversion of altitude angle, h from an angle to a ratio of numerals by trigonometric relationships for shadow calculation and subsequent plotting on the drawing paper with rulers and angle protractors. The foregoing results in the marking of shadow points and additional projection lines on the drawing paper which become confusing.

Accordingly, it would be advantageous if the process for estimating the shadow cast by a structure or its features could be less time consuming and tedious. It would also be advantageous if the models estimating the shadow cast by a structure or its features could be simplified.

SUMMARY

Disclosed herein is an apparatus for estimating a shadow. The apparatus includes a circular disk and declination lines associated with particular dates of the year. The declination lines are parallel to a diameter of the circular disk and correspond to the declination angle of the earth on the date associated therewith. The apparatus also includes arcs which correspond to particular times of day. The circular disk can also include a slot traversing a second diameter which facilitates insertion of a pencil tip therein.

DETAILED DESCRIPTION OF PREFERRED EMBODIMENTS

Figure 1A:
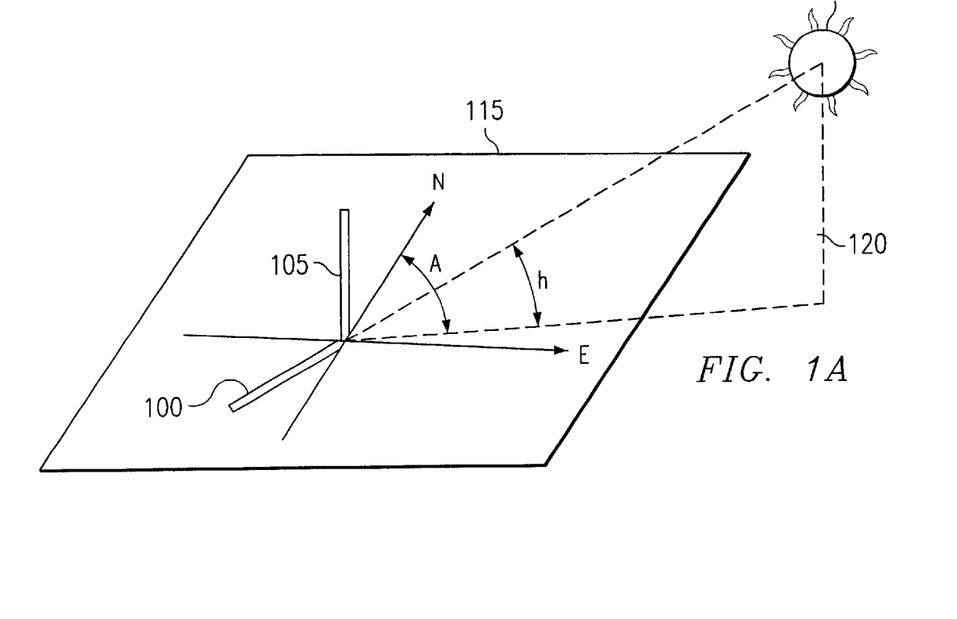
FIG. 1A is block diagram of a shadow cast by structure in the presence of direct sunlight.

Referring now to FIG. 1A, there is illustrated a block diagram of a shadow 100 cast by a structure 105 in the presence of direct sunlight 110. In addition to the properties of the structure 105, the positions and dimensions of the shadow 100 cast by the structure 105 are also a function of the sun's 110 position. The sun's 110 position is associated with attributes known as an azimuth A, and an altitude h.

The azimuth A is the angle of the sun's 110 position with respect to a horizontal plane 115 at the base of the structure 105. Although the earth is spherical, the earth's surface in the immediate vicinity of the structure 105 is approximated by a horizontal plane 115 with reasonable accuracy. By convention, the sun 110 appearing due north has 0 degree azimuth A, while the sun 110 appearing due east has a 90 degree azimuth A. The altitude h is the angle of the sun's position 110 along a vertical plane 120 orthogonal to the horizontal plane 115 and containing the structure 105 and the center of the sun 110. At sunrise and sunset, the altitude h is 0 degrees. The azimuth A and altitude h are functions of the earth's position relative to the sun 110.

Figure 1B:
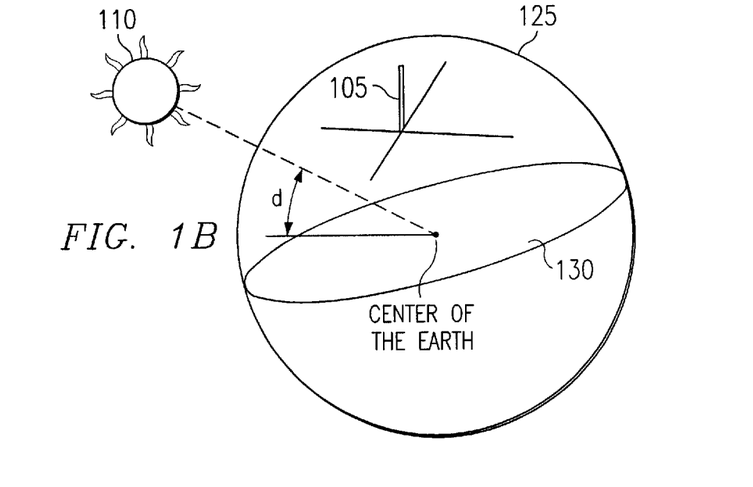
FIG. 1B is a block diagram of the earth's position relative the sun.

Referring now to FIG. 1B, there is illustrated a block diagram of the earth 125 relative to the sun 110. The azimuth A, and altitude angle h are dependent on the latitude of the structure with respect to the earth 125, the declination angle of the sun 110 with respect to the earth, and the structure's 105 rotational orientation with respect to the sun 110.

The use of latitude coordinates are well known in the art. The declination angle d is an angle formed by a disk 130 defined by the equator of the earth 125 and a line from the center of the earth 205 to the center of the sun 110. The declination angle d is dependent on the date of year and is 23.5 degrees at the summer solstice (June 21), −23.5 degrees at the winter solstice (December 22), and 0 degrees at the equinox (September 23, and March 21). The rotational orientation of the structure 105 is based on the earth's rotation and is measured by a parameter known as Apparent Solar Time (AST). Accordingly, the azimuth A and altitude angle h of the sun can be determined for a structure 105, if the latitude, date, and AST are known.

Figure 2:
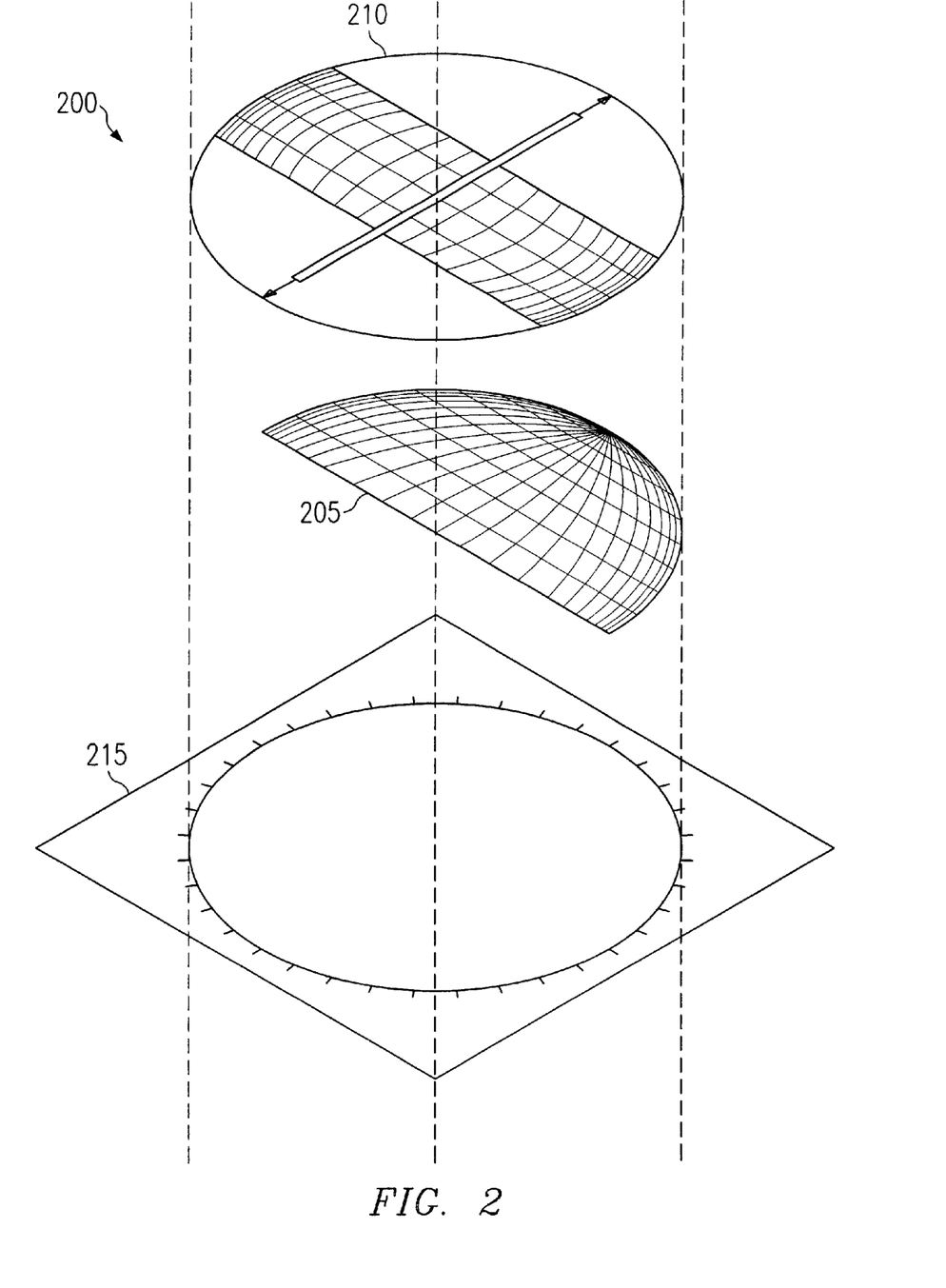
FIG. 2 is a block diagram of a shadow plotter.

Referring now to FIG. 2, there is illustrated a block diagram of a shadow plotter 200 which correlates the AST, latitude, and date to the azimuth A and altitude h. The shadow plotter 200 includes a hemispherical coordinate system 205, a spherical segment disk 210, and an angular plate 215.

Figure 2A:
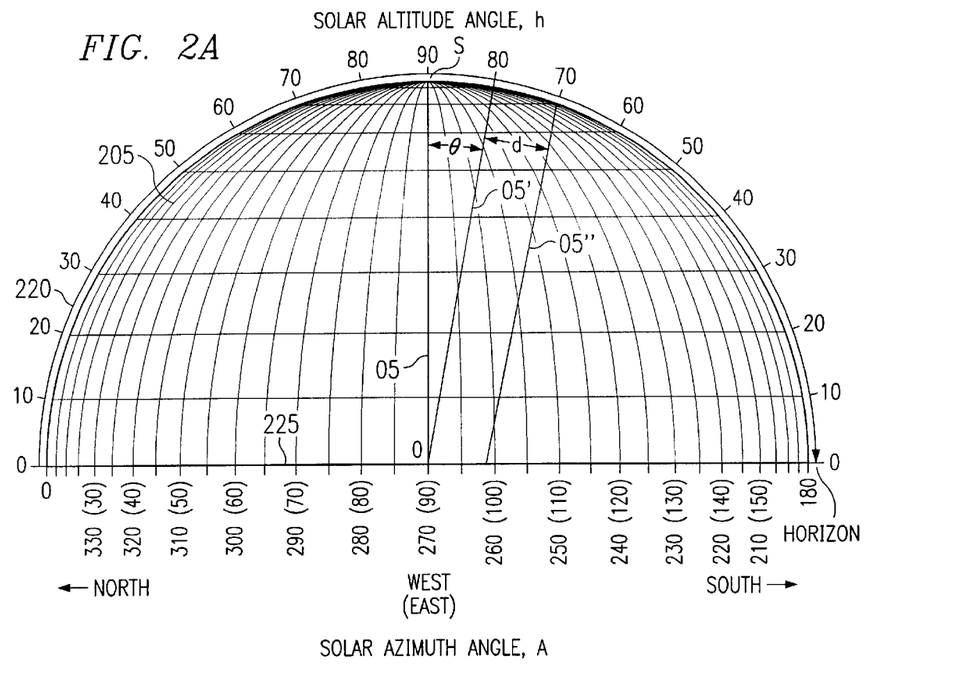
FIG. 2A is a block diagram of a spherical coordinate system.

Referring now to FIG. 2A, there is illustrated the hemispherical coordinate system 205 of FIG. 2. The hemispherical coordinate system 205 includes altitude coordinates 220 and azimuth coordinates 225. The altitude coordinates 220 are used to calculate the altitude h, while the azimuth coordinates 225 are used to calculate the azimuth A.

The hemispherical coordinate system 205 is a model describing the azimuth A and the altitude angle h of a stationary point S from a vantage point at a rotating point O rotating about an axis orthogonal to a line formed by the stationary point and the rotating point. From the vantage point on the rotating point O, the path of the stationary point S (in terms of azimuth A and altitude angle h) as the rotating point O rotates is defined by a line OS on the hemispherical coordinate system 205 connecting the stationary point S and the rotating point O. However, where the vantage point is at an angle θ degrees north of the line connecting the stationary point S and the rotating point O, the angle of the vantage point is compensated by offsetting the path OS by −θ degrees or +θ degrees south, thereby producing the path OS'.

There are two fundamental differences between the stationary point S/rotating point O relationship and the earth 125/sun 110 relationship. The first difference is that the vantage point is measured from a point as opposed to a surface on a sphere. Therefore, the spherical coordinate system 205 more accurately describes the earth 125/sun 110 relationship at the center of the earth 125. However, because the distance between the earth 125 and the sun 110 (approximately 93 million miles) is much larger than the diameter of the earth 125 (approximately 8000 miles), the hemispherical coordinate system 205 is reasonably accurate for most architectural applications.

The other fundamental difference is that the axis of the earth's 125 rotation is only orthogonal to a line connecting the earth 125 to the sun 110 at the equinox. In contrast, the axis of the earth's 125 rotation, the declination angle, varies between −23.5 degrees to 23.5 degrees, depending on the date of year. This difference is compensated for by offsetting the equinox line, e.g. line OS' at the solar altitude angle h axis by the declination angle d and drawing a line parallel to equinox line OS', thereby rendering line OS". Line OS" represents the path of the sun 115 for a location at θ degrees latitude when the declination angle of the sun 115 is d. The declination angle d of the sun 115 is a function of the date of year and can be found in an almanac.

Figure 2B:
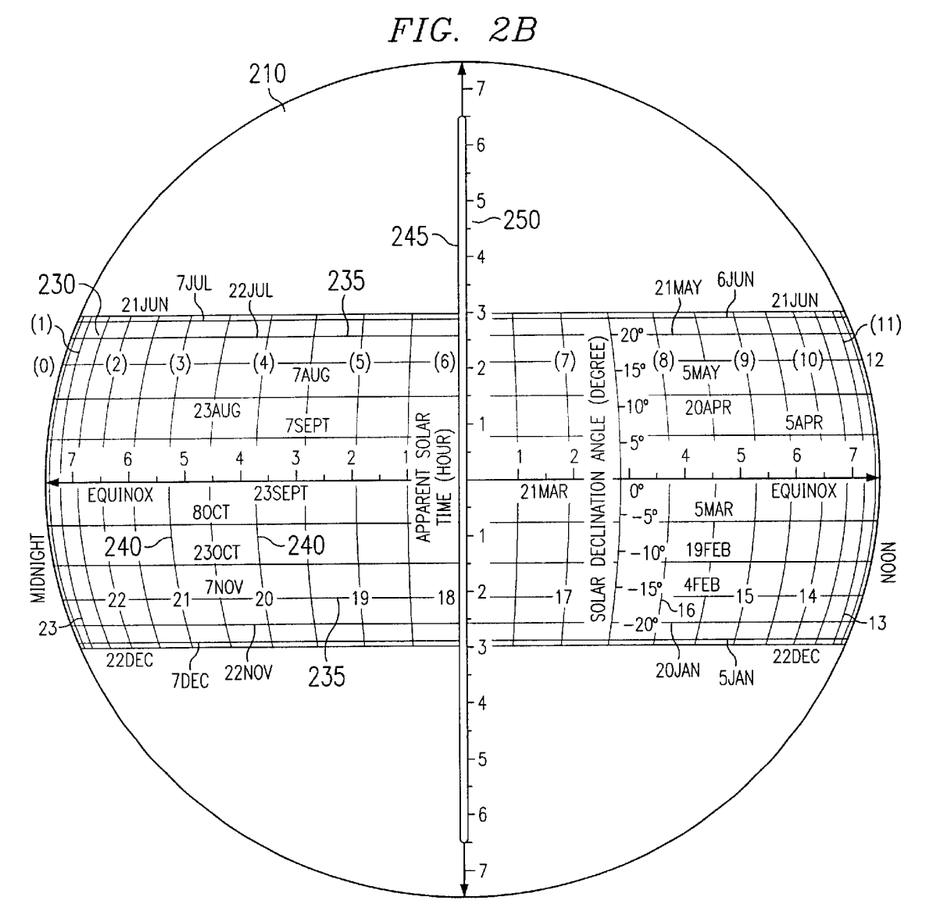
FIG. 2B is a block diagram of a spherical segment disk.

Referring now to FIG. 2B, there is illustrated a spherical segment disk 210. The spherical segment disk includes a spherical segment 230 made of substantially transparent material which correlates the declination angle d of the sun 110 to the dates 235 of the year. The spherical segment 230 is also appropriately scaled such that the declination angle d corresponds with altitude coordinates 220 of the hemispherical coordinate system 205. The spherical segment 230 also includes an apparent solar time (AST) axis 240. The AST axes 240 corresponds to the azimuth coordinates 225 of the hemispherical coordinate system 205 wherein one hour is equivalent to 15 degrees along the azimuth coordinates 225 for the north pole. The spherical segment disk 210 includes a slot 245 along a diameter which traverses the 0600/1800 AST line for facilitating insertion of a pencil tip. Along the slot 245 is a ruler 250 for measurements in either metric or English units.

The spherical segment disk 210 and the hemispherical coordinate system 205 can be used to determine the azimuth A, and the altitude h for a location at latitude L, at a particular date and AST. The azimuth A and altitude angle h are determined by overlaying the spherical segment disk 210 onto the hemispherical coordinate system 205, such that the slot 245 is aligned with the azimuth axis and the 0 degree declination angle line (the equinox line) is aligned with OS. To compensate for the latitude L, the spherical segment disk 210 is rotated the degrees of latitude in the opposite direction. For example, for a location at 40 degrees N, the spherical segment disk 210 is rotated 40 degrees S with respect to the hemispherical coordinate system 205. After rotating the spherical segment disk 210 to compensate for the latitude coordinates, the azimuth A and altitude angle h can be found for a given date and AST by reading the coordinates on the hemispherical coordinate system 205 underlying the date and AST point on the spherical segment disk 210.

Figure 2C:
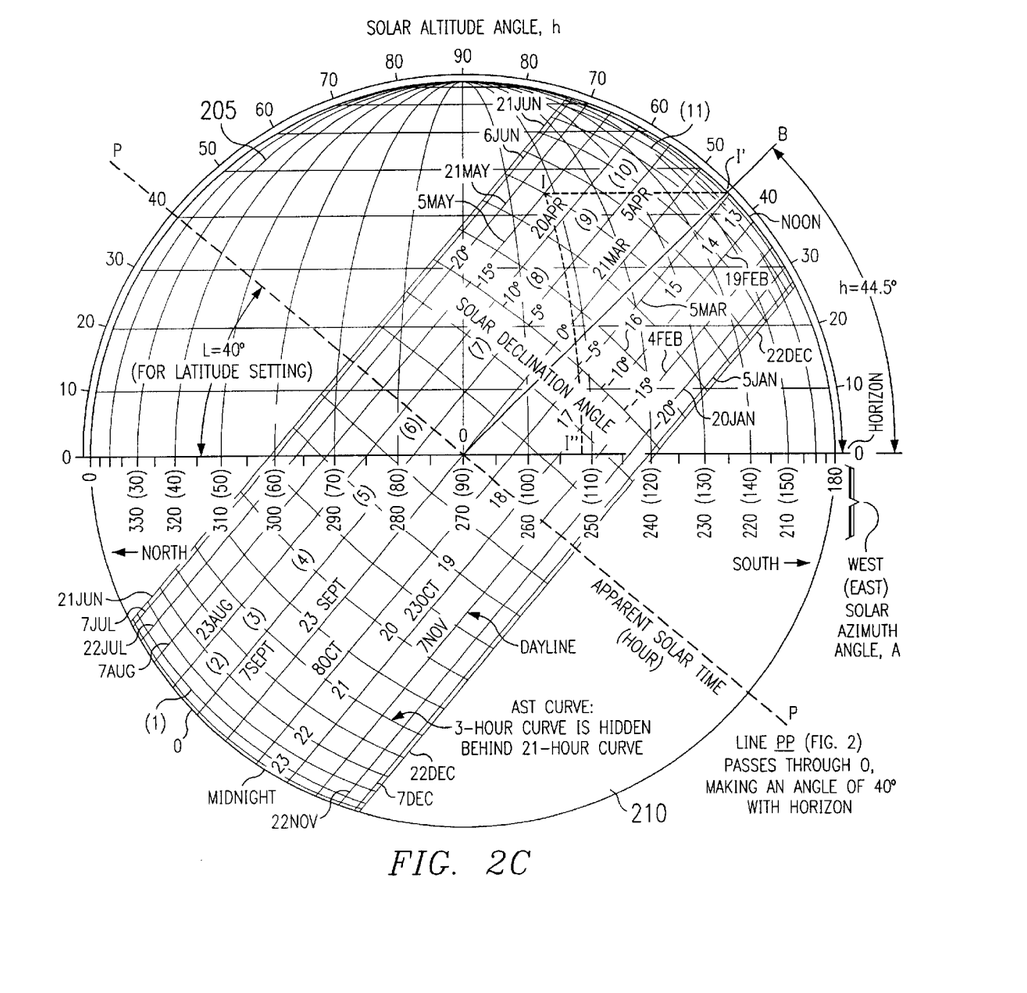
FIG. 2C is a block diagram of a spherical segment disk overlaying the spherical coordinate system.

Referring now to FIG. 2C, there is illustrated the spherical segment disk 210 overlaying the spherical coordinate system 205 to calculate the azimuth A, and the altitude angle h, at an exemplary location at a latitude of 40 degrees N on May 5th at 0900 AST. The spherical segment disk 210 is rotated 40 degrees south to compensate for the latitude. This is depicted in FIG. 2C by line P, which intersects the solar altitude angle indicia at an angle of 40 degree. The point representing May 5th at 0900 AST is plotted as I, and the underlying coordinates of the hemispherical system are h=44.5 degrees, which is the intersection of line I–I' with the solar altitude angle indicia of the hemispherical coordinate system 205. The intersection of line I–I' with the solar altitude angle indicia of the hemispherical coordinate system 205 is further illustrated by line B in FIG. 2C. The azimuth angle of 108.5 degrees from north (or 18.5 degrees south of east) can be determined from FIG. 2C by measuring the intersection of arc I–I" with the azimuth indicia 225 of the hemispherical coordinate system 205.

Figure 2D:
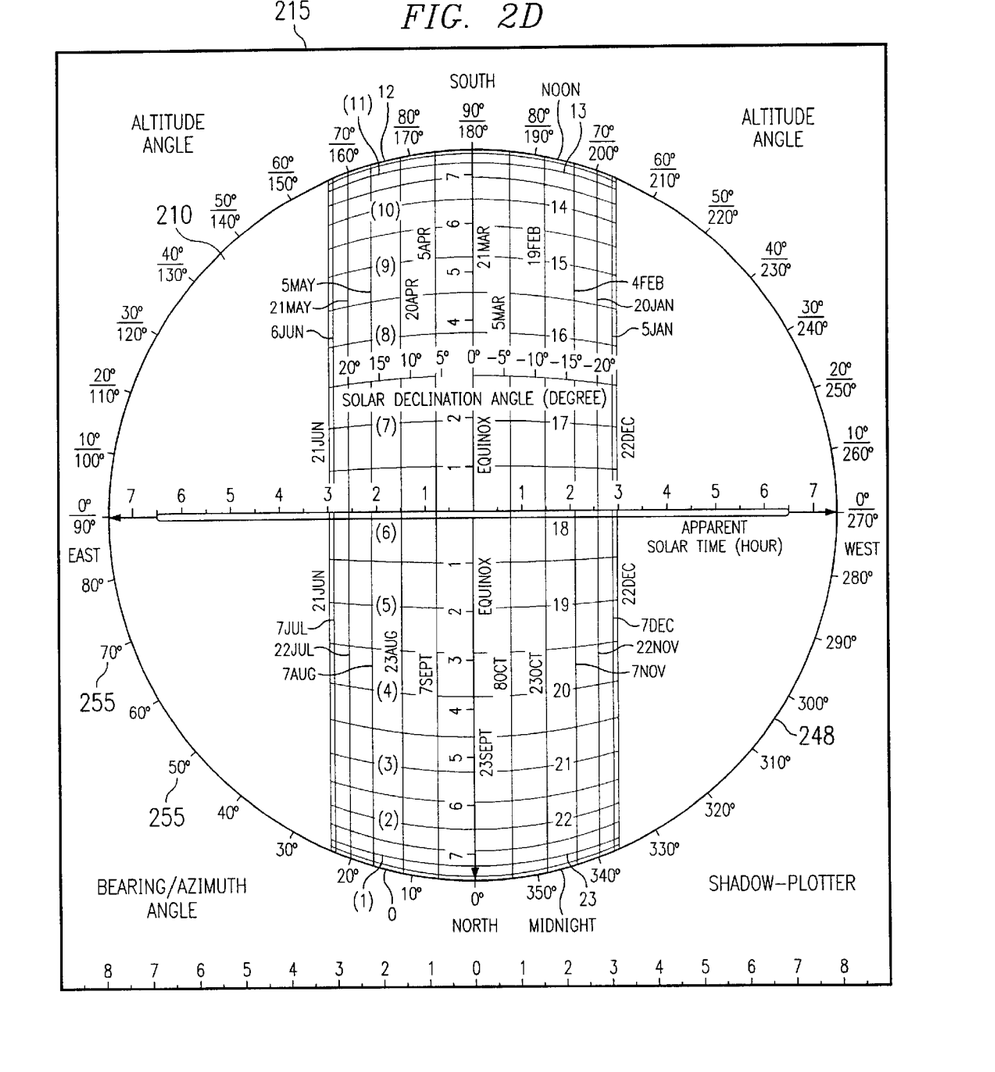
FIG. 2D is a block diagram of a spherical segment disk overlaying the angular plate.

Referring now to FIG. 2D there is illustrated the spherical segment disk 210 overlaying an angular plate 215. The angular plate 215 defines a circular hole 248 approximately equal in size to the spherical segment disk 210. The circular hole 248 facilitates insertion and rotatable engagement with the spherical segment disk 210 therein. The angular plate 215 is marked with incremental angle measurements 255.

Figure 3:
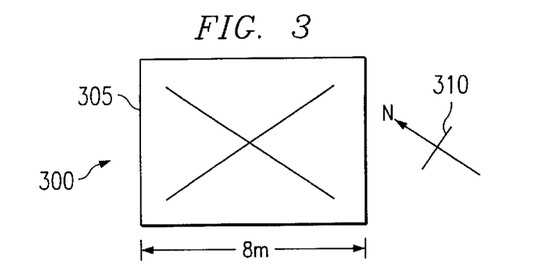
FIG. 3 is an exemplary scaled architectural diagram.

Referring now to FIG. 3, there is illustrated an exemplary scaled architectural diagram 300 of a structure 305. The scaled architectural diagram 300 includes a scaled overhead drawing of the structure 305 as well as a compass 310 indicating the orientation of the structure 305. In accordance with the present invention, the scaled architectural diagram 300 can be used to estimate the shadow cast by the structure 305 at a particular date and apparent solar time(s), wherein the latitude location of the structure 305 is known.

Figure 4:
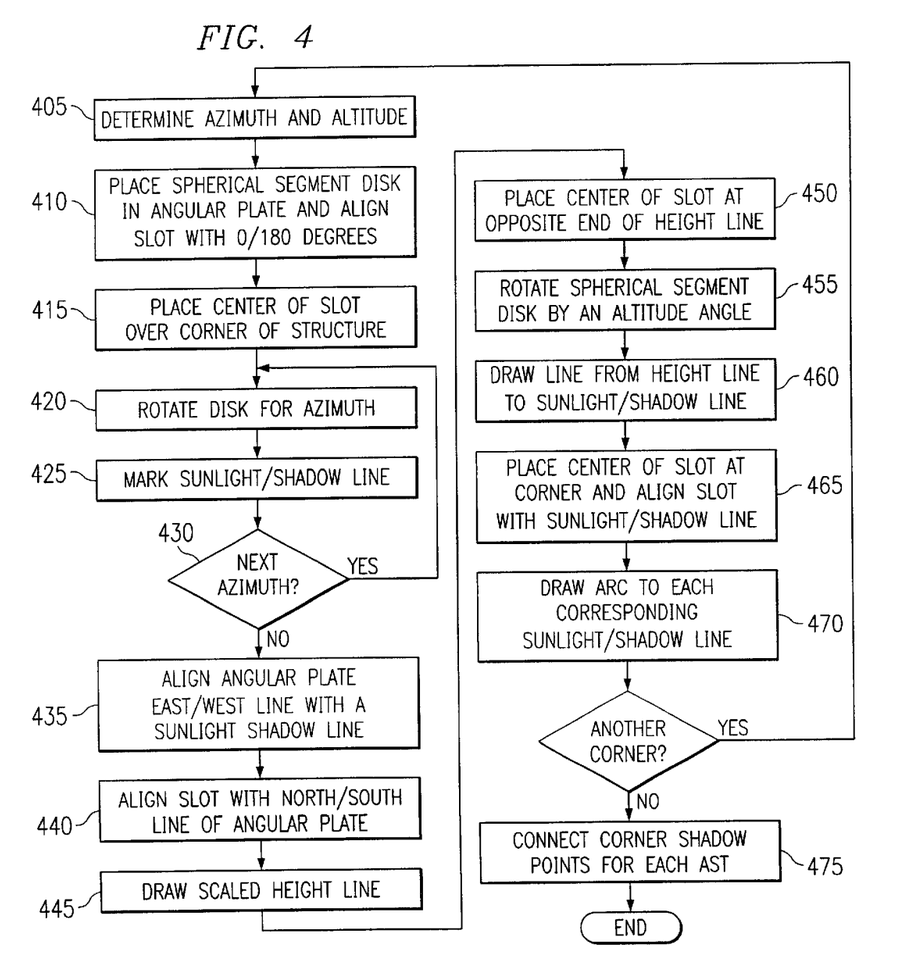
FIG. 4 is flow diagram for estimating the shadow of a structure.

Referring now to FIG. 4, there is illustrated a flow diagram for estimating a shadow cast by a structure, such as structure 305 in the scaled architectural diagram 300. The flow diagram will be described with reference to the exemplary case where the structure is located at a 40 degree north latitude on May 5 at apparent solar times 7–10 am on the hour.

At step 405, the solar azimuth angle and solar altitude angle are determined for each of the relevant apparent solar times. The solar azimuth angle and solar altitude angle are determined by placing the spherical segment disk 210 over the hemispherical coordinate system 205 as shown in FIG. 2C and then determining the coordinates of the hemispherical coordinate system 205 which underlie the date and times on the spherical segment. In the present exemplary case, the azimuth angle A, and the solar altitude h are as shown in TABLE 1.

TABLE 1

| App. Solar Time | Azimuth Angle, A | Solar Altitude Angle, h |
| --- | --- | --- |
| 0700 | 86.5 | 25.5 |
| 0800 | 97 | 33 |
| 0900 | 108 | 44.5 |
| 1000 | 124 | 54 |

Figure 5:
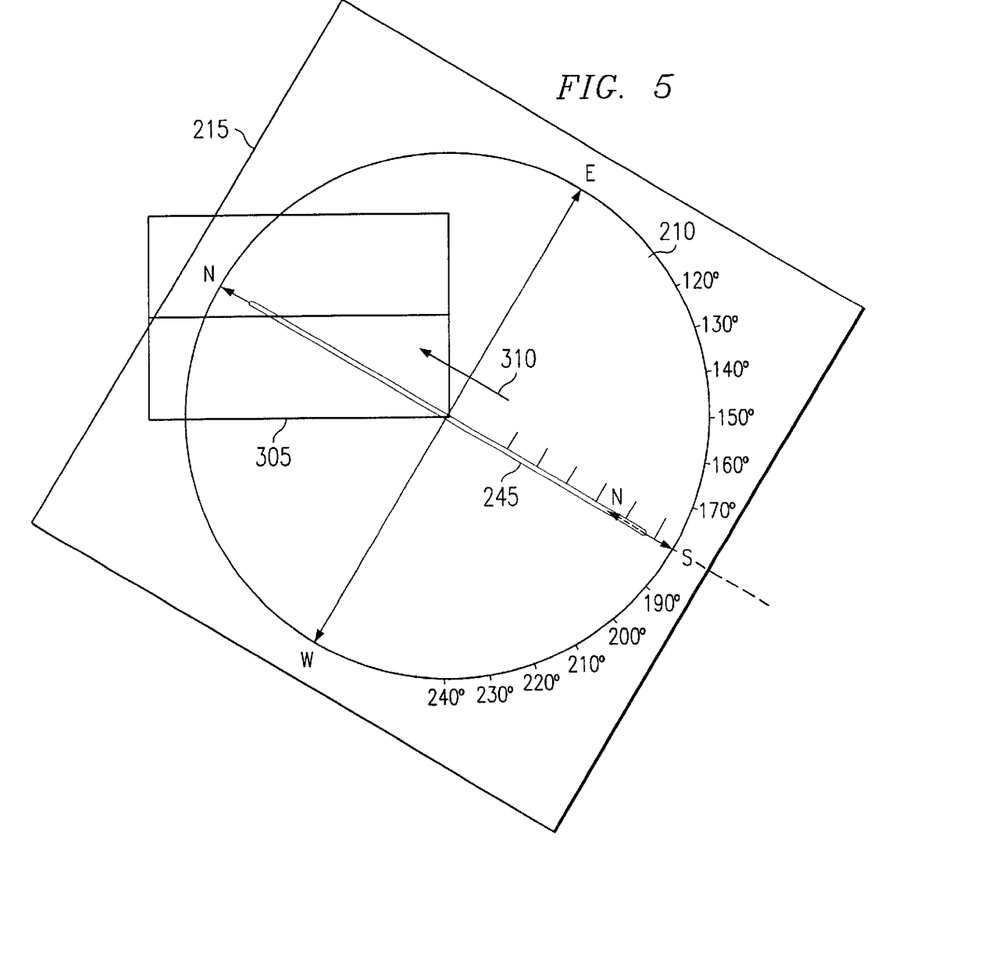
FIG. 5 is an exemplary illustration of the spherical segment disk and the angular plate over the scaled architectural diagram.

At step 410, the spherical segment disk 210 is placed in the circular hole 248 of the angular plate 215 and rotated such that the slot 245 is aligned with the 0/180 degree angles of the angular plate 215. The spherical segment disk 210 and angular plate 215 position with respect to each other are maintained and each component is placed over the scaled architectural diagram 300 such that the slot 245 is parallel to the North direction of the compass 310, and the center of the slot 245 is located over a corner on the nearest edge of the structure in the northern direction (step 415). The placement of the spherical segment disk 210 and the angular plate 215 over the scaled architectural diagram 300 for the present exemplary case is illustrated in FIG. 5.

Figure 6:
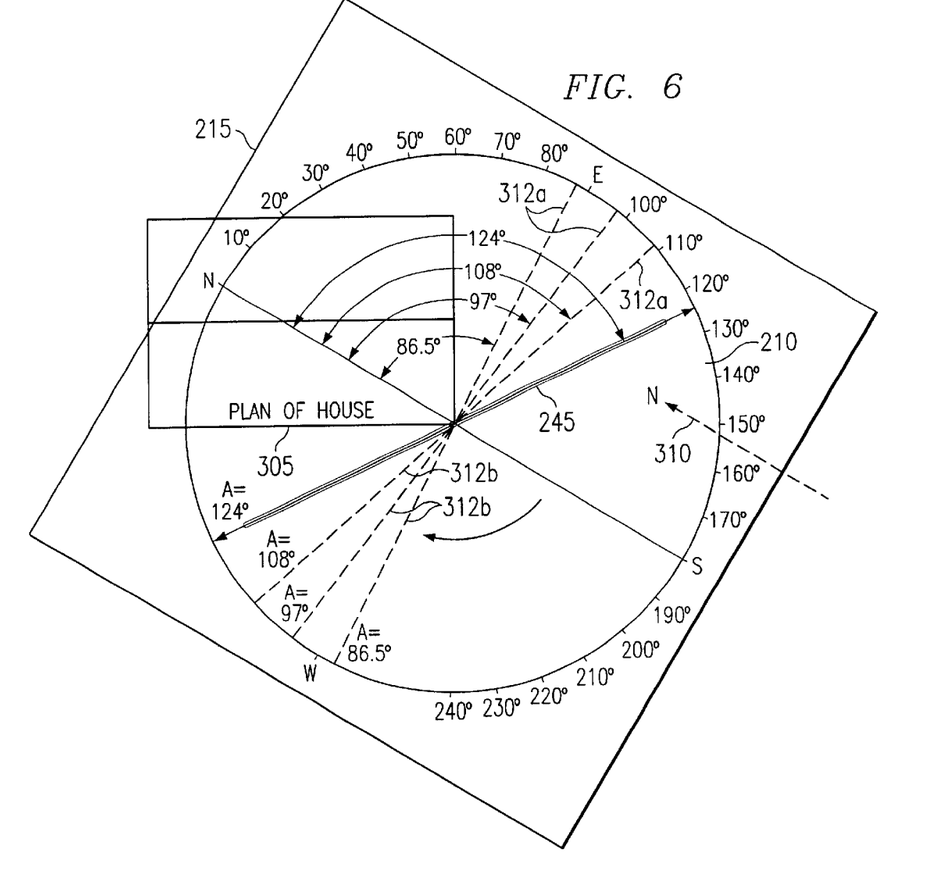
FIG. 6 is an exemplary illustration of sunlight/shadow lines marked on the scaled architectural diagram.

At step 420, the spherical segment disk 210 is rotated with respect to the 0 degrees North of angular plate 215 at an angle equivalent for a particular azimuth A. The location of the slot 245 describes the path of sunlight cast against the corner of the structure. The portion of the slot 245 from the end at the azimuth angle on the angular plate 215 to the corner of the structure 305 describes the path of sunlight cast against the corner of the structure 305; known as the sunlight line. The portion of the slot 245 from the corner of the structure 305 to the end of the slot 245 that is opposed to the azimuth angle on the angular plate 215 describes the angle of the shadow cast by the corner of the structure 305, known as the shadow line. At step 425, the sunlight line and shadow line are marked by insertion of a pencil or pen into the slot and traversing the slot. Steps 420 and 425 are repeated for each azimuth angle. The sunlight lines 312a and shadow lines 312b are shown for the present exemplary case in FIG. 6 for each of the azimuth angles of TABLE 1.

Figure 7:
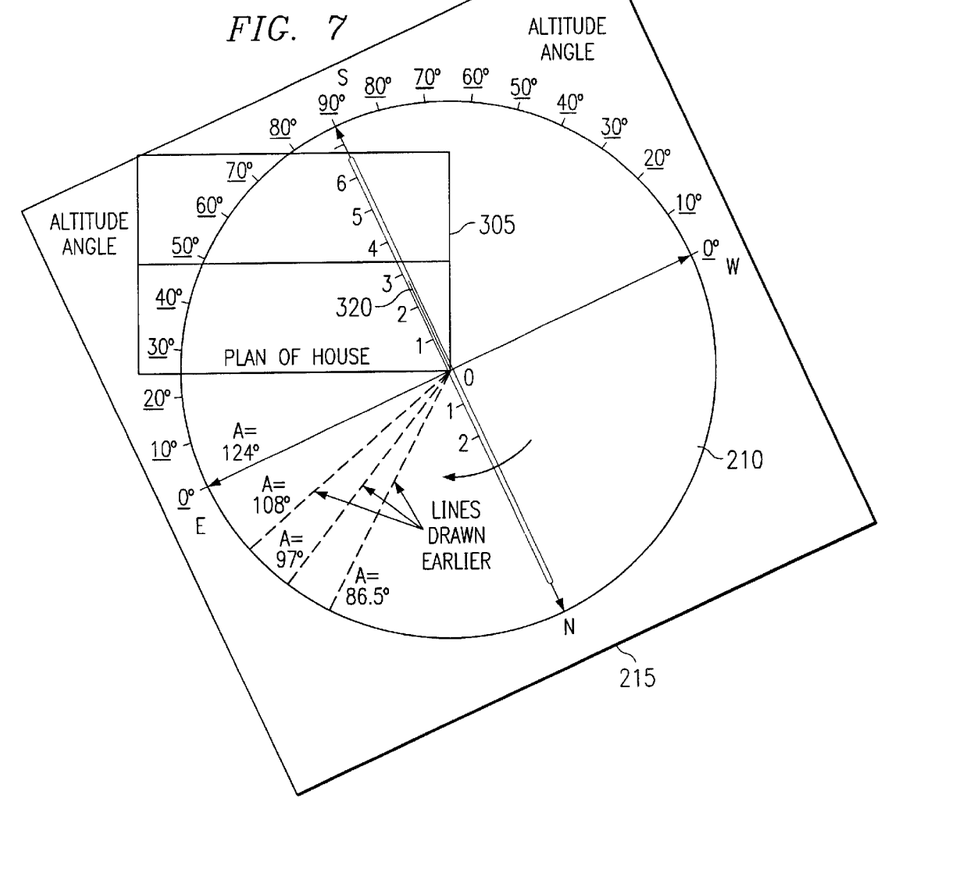
FIG. 7 is an exemplary illustration of a height line marked on the scaled architectural diagram.

After the sunlight lines 312a and shadow lines 312b are marked for each azimuth angle during steps 420–430, the angular plate 215 is rotated to align the east/west line with any one of the sunlight/shadow lines 312a, 312b (step 435). The spherical segment disk 210 is rotated so that the slot 245 is aligned with the north/south line (step 440). At step 445, a height line is drawn with a length representing the scaled height of the corner of the structure 305. In the present exemplary case, the height of the corner of the structure is 3 meters which corresponds to 3 cm in the scaled architectural diagram 300. Accordingly, a height line with a length of 3 cm is drawn from the center of the slot 245. In FIG. 7, the height line 320 is shown for the present exemplary case when the AST is 10 am.

Figure 8:
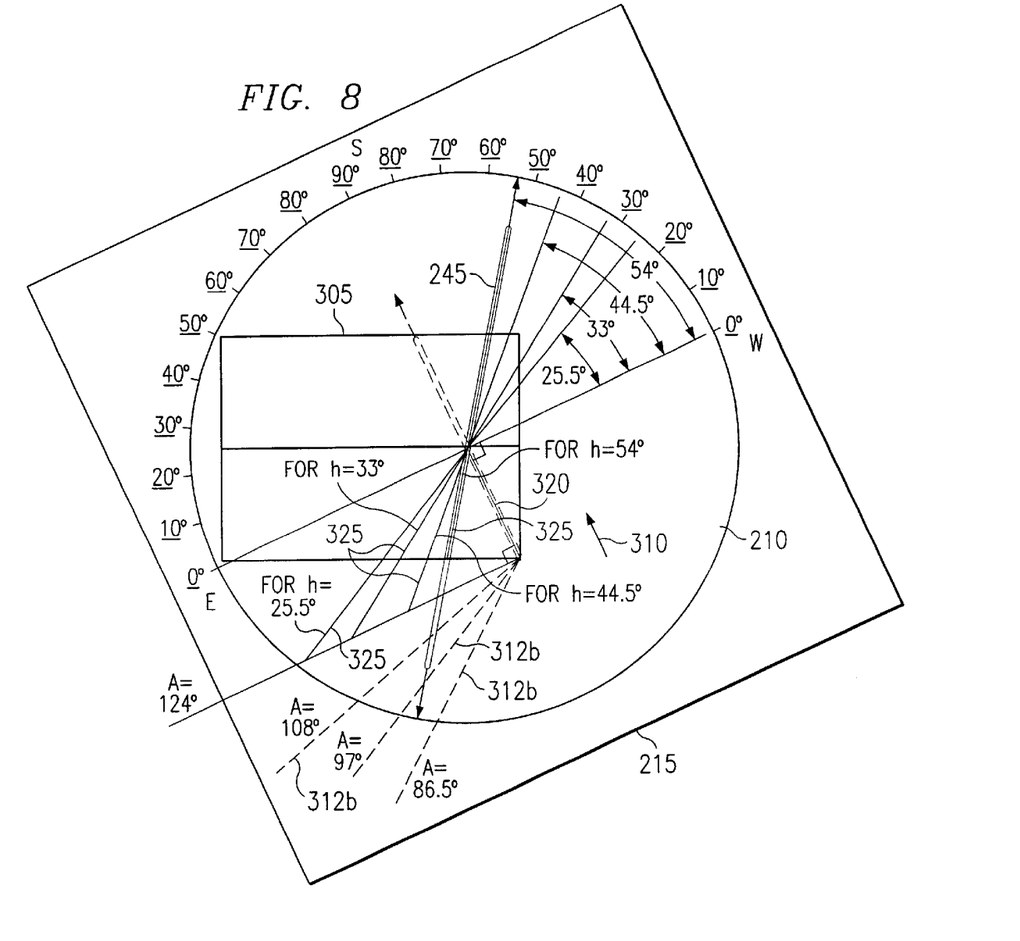
FIG. 8 is an exemplary illustration of height line projections on a sunlight/shadow line on the scaled architectural diagram.

At step 450, the center of the slot 245 is placed at the opposite end of the height line 320 drawn in step 445 and alignment of the slot 245 with the height 320 line and the north/south line of angular plate 215 maintained. During step 455, the spherical segment disk 210 is rotated with an angle equivalent to an altitude angle h and a projection line is drawn traversing the slot 245 from the endpoint of the height line 320 to the nearest shadow line 312b (step 460). Steps 455 and 460 are repeated for each solar altitude angle and the resulting projection lines 325 on the scaled architectural diagram 300 are illustrated in FIG. 8.

Figure 9:
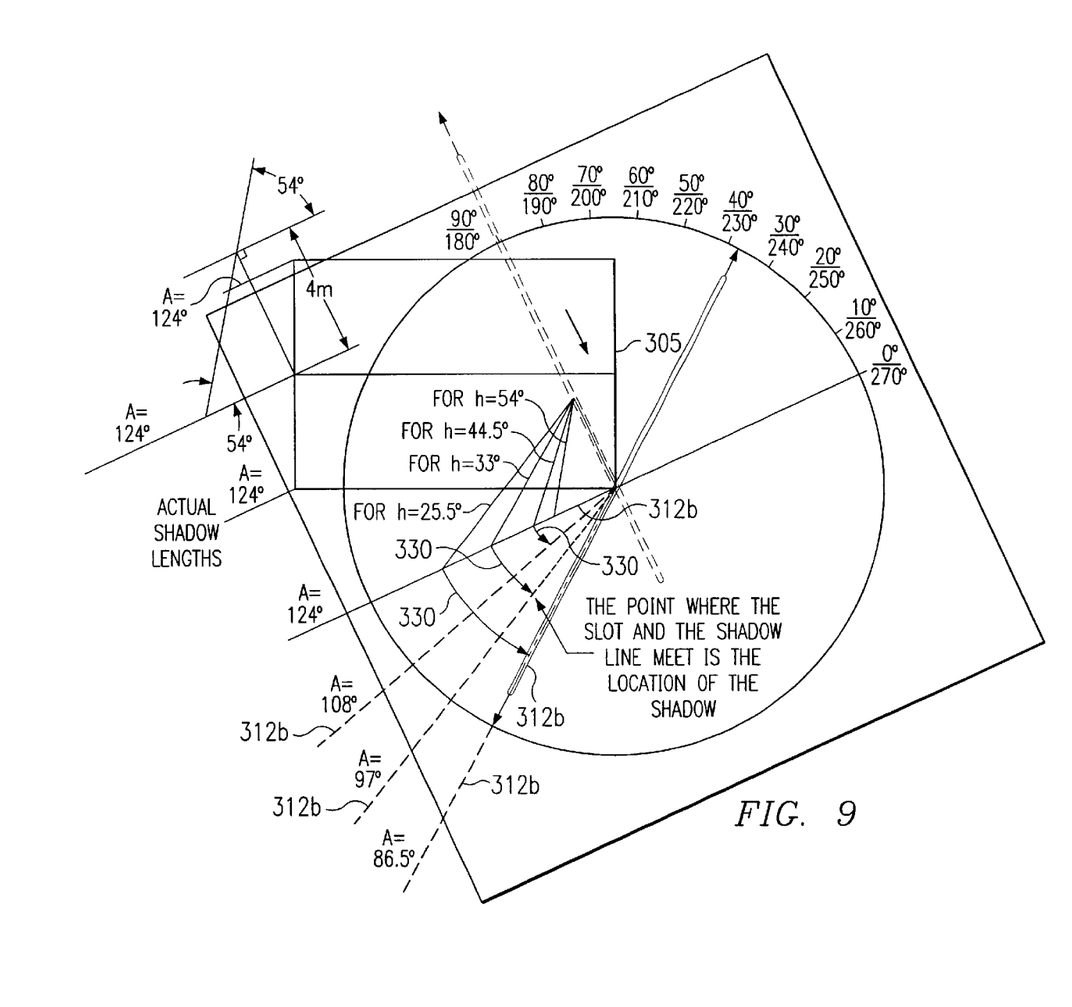
FIG. 9 is an exemplary illustration of corner shadow points on the scaled architectural diagram.
Figure 10:
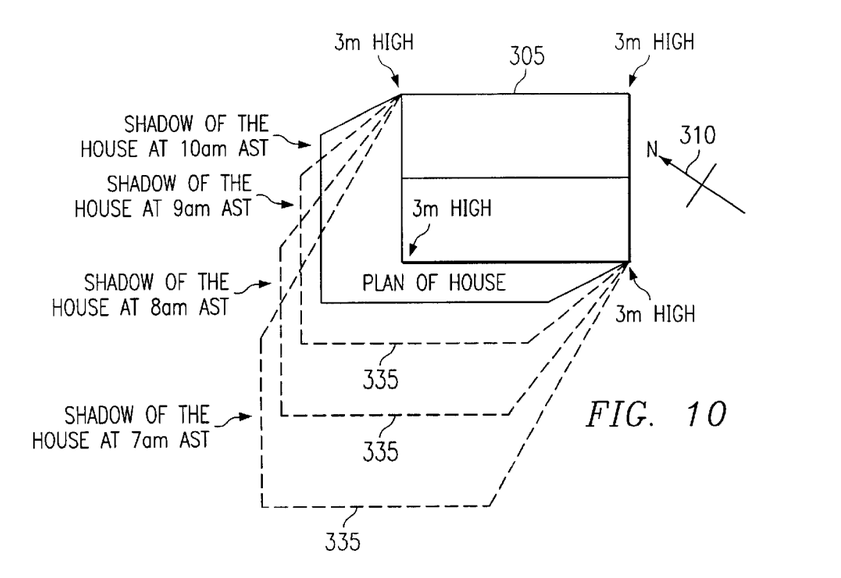
FIG. 10 is an exemplary illustration of shadow estimation for a structure on the scaled architectural diagram.

At step 465, the spherical segment disk 210 is rotated such that the slot 245 is aligned with the nearest shadow line 312b and the center of the slot 245 is over the corner of the structure 305. At step 470, an arc is drawn from each of the projection lines 325 to each of the corresponding shadow lines. The segment of the shadow line 312b from the corner of the structure 305 to the point where the corresponding arc intersects represents the shadow cast by the corner of the structure at the corresponding apparent solar time. The scaled architectural diagram 300 with the arcs 330 drawn therein is illustrated for the present exemplary case in FIG. 9. Steps 410 through 470 are repeated for each corner of the structure 305. Lines connecting each of the corner shadow points corresponding to a particular apparent solar time are drawn during step 475 and repeated for each of the remaining apparent solar times. The lines connecting each of the corner shadow points approximate the shadow that is cast by the structure at the corresponding apparent solar time. The resulting shadow diagrams 335 are shown in FIG. 10.

Although an exemplary embodiment is illustrated in the accompanying drawings and described in the foregoing detailed description, it will be understood that the inventions are not limited to the embodiments disclosed, but are capable of numerous rearrangements, modifications and substitutions without departing from the spirit of the inventions that are defined by the following claims and equivalents thereof.

What is claimed is:

1. An apparatus for estimating a shadow on a diagram, the apparatus comprising:
   a circular disk comprising:
      a first indicia line traversing a first diameter of the circular disk;
      a plurality of lines parallel to said first indicia line;
      a plurality of indicia arcs, wherein each of said arcs is normal to said first line;
      a slot traversing a diametric portion of the circular disk wherein the slot includes linear scale indicia to facilitate the drawing of projection lines on the diagram; and
   an angular plate, the angular plate surrounding the circular disk, wherein the circular disk is rotatably engaged with the angular plate and is substantially transparent so that features on the diagram may be viewed through the circular disk when it is placed on the diagram.

2. The apparatus of claim 1, wherein the slot is perpendicular to the first indicia line.

3. The apparatus of claim 2, wherein the indicia further comprise:
a plurality of date indicia, wherein each of said plurality of date indicia is associated with at least a particular one of the plurality of lines.

4. The apparatus of claim 2, wherein the indicia further comprise:
a plurality of time indicia, and wherein each of said time indicia is associated with a particular one of the plurality of arcs.

5. The apparatus of claim 1, wherein the indicia further comprise:
a plurality of date indicia, wherein each of said plurality of date indicia is associated with at least a particular one of the plurality of lines.

6. The apparatus of claim 1, wherein the indicia further comprise:
a plurality of time indicia, and wherein each of said time indicia is associated with a particular one of the plurality of arcs.

7. The apparatus of claim 1, further comprising:
a plurality of angle indicia on the angular plate.

8. The apparatus of claim 7, wherein the slot is perpendicular to the first line.

9. A method for estimating a shadow cast by a structure located at a latitude coordinate, said method comprising:
providing a scaled architectural diagram of an area including the structure;
determining an azimuth angle and an altitude angle;
performing each of the following steps a) through j) for each corner of the structure casting a shadow at the determined azimuth and altitude angles:
a) placing a spherical segment disk with a slot and a center of the slot over the scaled architectural diagram, wherein the center of the slot is over a portion of the scaled architectural diagram corresponding to a corner of said structure;
b) placing an angular plate around the spherical segment disk, the angular plate defining an inner circumference that is substantially similar to an outer circumference of the spherical segment disk, wherein the angular plate comprises a plurality of indicia adjacent to the inner circumference indicating angular divisions of the inner circumference;
c) rotating the spherical segment disk at a first angle, the first angle corresponding to the azimuth angle;
d) marking a shadow line on the scaled architectural diagram corresponding to the slot;
e) marking a height line having a length corresponding to a height of the structure, the height line having a first endpoint at the portion of the scaled architectural diagram corresponding to the corner of the structure and a second end point, the height line being perpendicular to the shadow line;
f) placing the spherical segment disk over the scaled architectural diagram, wherein the center of the slot is over the second end point and the slot is aligned with the height line;
g) placing the angular plate around the spherical segment disk;
h) rotating the spherical segment disk at a third angle, the third angle equivalent to the altitude angle;
i) marking a projection line corresponding to the slot, the projection line extending from the second end point to the shadow line;
j) marking a shadow edge corresponding to the shadow cast by a structure, the shadow edge extending from the corner of the structure, along the shadow line, and terminating at the intersection of the projection line with the shadow line; and
connecting each of the marked shadow edges so as to define a shadow cast by the structure at the determined azimuth and altitude.

10. The method of claim 9, wherein determining the azimuth angle and the altitude angle further comprises:
overlaying a spherical segment disk over a hemispherical coordinate system so that the slot is aligned with a vertical meridian on the hemispherical coordinate system, the spherical segment disk comprising:
a first indicia line traversing a first diameter of the spherical segment disk, wherein the first indicia line is perpendicular to the slot;
a plurality of lines parallel to said first indicia line, wherein each of the plurality of lines corresponds to a date;
a plurality of indicia arcs arranged orthogonally with respect to the first indicia line, wherein each of the indicia arcs corresponds to an apparent solar time;
rotating the spherical segment disk at a second angle corresponding to the latitude coordinate of the structure;
identifying a first location on the spherical segment corresponding to a desired apparent solar time on a desired date;
identifying an altitude angle on the hemispherical coordinate system corresponding to the first location;
identifying an azimuth angle on the hemispherical coordinate system corresponding to the first location.

11. An apparatus for estimating a shadow on a scaled diagram, the apparatus comprising:
a circular disk comprising an equinox indicator traversing a diametric portion of the circular disk and a slot traversing a diametric portion of the circular disk wherein the slot and the equinox indicator are perpendicular to each other and wherein the slot includes a linear scale to facilitate the drawing of projection lines on the scaled drawing and wherein the circular disk is substantially transparent so that features on the diagram may be viewed through the circular disk when it is placed on the diagram;
an angular plate defining a circular cavity having an inner circumference that is substantially similar to a outer circumference of the spherical segment disk, wherein the angular plate comprises a plurality of indicia adjacent to the circular cavity indicating angular divisions of the inner circumference.

* * * * *